United States Patent [19]

Chang et al.

[11] Patent Number: 4,847,832
[45] Date of Patent: Jul. 11, 1989

[54] TIME MULTIPLEXED DATA TRANSMISSION SYSTEM

[75] Inventors: Paul S. Chang, Harrisburg; Lee W. Steely, Reinholds, both of Pa.

[73] Assignee: AMP Incorporated, Harrisburg, Pa.

[21] Appl. No.: 921,185

[22] Filed: Oct. 21, 1986

[51] Int. Cl.$^4$ .............................................. H04L 5/14
[52] U.S. Cl. .................................... 370/85; 370/29
[58] Field of Search ............... 370/29, 85, 86, 14, 370/89, 92, 96, 100; 340/825.65, 825.07, 825.52, 825.21, 825.08, 825.2; 375/108; 371/47, 61

[56] References Cited

U.S. PATENT DOCUMENTS

| | | | |
|---|---|---|---|
| 3,430,144 | 2/1969 | Murakami et al. | 371/47 |
| 3,601,806 | 8/1971 | Heimbigner | 340/151 |
| 3,911,218 | 10/1975 | Suzuki et al. | 370/85 |
| 3,952,286 | 4/1976 | Wakamatsu et al. | 340/825.07 |
| 4,144,448 | 3/1979 | Pisciotta et al. | 375/108 |
| 4,156,112 | 5/1979 | Moreland | 179/15 AL |
| 4,290,134 | 9/1981 | Hampshire | 370/92 |
| 4,293,947 | 10/1981 | Brittain | 370/89 |
| 4,370,561 | 1/1983 | Briggs | 370/9 |
| 4,376,278 | 3/1983 | Jacobsthal | 370/85 |
| 4,435,706 | 4/1984 | Callan | 340/825.08 |
| 4,475,191 | 10/1984 | James et al. | 370/29 |
| 4,535,448 | 8/1985 | Baxter et al. | 370/85 |
| 4,559,536 | 12/1985 | Olesen et al. | 340/825.65 |
| 4,679,192 | 7/1987 | Vanbrabant | 340/825.52 |

FOREIGN PATENT DOCUMENTS

| | | |
|---|---|---|
| 51893 | 8/1974 | Australia . |
| 2412959 | 10/1975 | Fed. Rep. of Germany . |
| 1437097 | 3/1966 | France . |
| 2245036 | 4/1975 | France . |
| 2528646 | 12/1983 | France ........................ 370/29 |

Primary Examiner—Douglas W. Olms
Assistant Examiner—Melvin Marcelo

[57] ABSTRACT

A data transmission system includes an oscillator which generates an ongoing sequence of clock signals, each of which defines a respective time period. Several interface circuits including first and second interface circuits are connected to the oscillator by a clock channel adapted to carry the clock signals from the oscillator to the interface circuits and a data channel adapted to carry data signals between the interface circuits. The first interface circuit places the first data signal on the data channel during the time period corresponding to a preselected one of the clock signals in each set, and the second interface circuit reads the first data signal from the data channel during this preselected time period. In this way, the first data signal is transmitted directly from the first to the second interface circuit via the data channel.

19 Claims, 6 Drawing Sheets

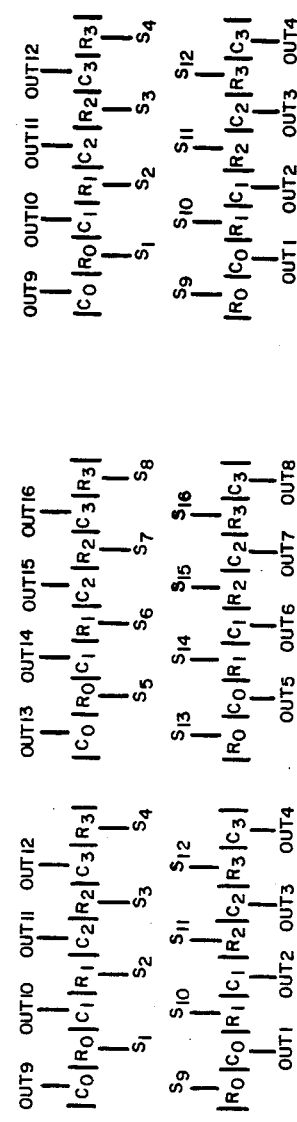

TIME MULTIPLEXED DATA TRANSMISSION SYSTEM

BACKGROUND OF THE INVENTION

The present invention relates to a data transmission system which utilizes multiplex techniques to transmit data signals among interface circuits.

In the past, a variety of multiplexing systems have been used to reduce the wiring requirements in data transmission systems. Related U.S. patent application Ser. No. 567,476 and U.S. Pat. No. 4,293,947 both disclose data transmission systems in which the central station is connected to a series of remote stations by a bus which transmits both clock signals and data signals. Each of the remote stations includes a counter which maintains a count of the clock pulses. Each of the remote stations has a unique address, and when the count of clock pulses equals the address, the respective remote station is enabled so as to transmit data between the remote station and the central station via the bus.

This approach to a data transmission system requires the use of a relatively sophisticated central station that receives data signals from the remote stations, processes the data signals, and then sends out commands to the remote stations. With this approach, the remote stations do not transmit data directly from one remote station to another; instead the central station always acts as an intermediary.

In many applications the cost and complexity of such a sophisticated central station may be excessive. The present invention is directed to an improved data transmission system which allows one remote station to communicate directly with another, thereby eliminating the need for a sophisticated central station.

SUMMARY OF THE INVENTION

According to this invention, a data transmission system is provided which comprises an oscillator comprising means for generating a plurality of sets of clock signals, wherein each of the clock signals defines a respective time period. A plurality of interface circuits including first and second interface circuits are also provided, along with means for transmitting signals among the oscillator and the interface circuits. This transmitting means includes a clock channel adapted to carry the clock signals from the oscillator to the interface circuits, and a data channel adapted to carry data signals between the interface circuits. First means are included in the first interface circuit for placing a first data signal on the data channel during the time period corresponding to a particular one of the clock signals within each set. Second means are included in the second interface circuit for reading the first data signal from the data channel during this time period. The first and second means cooperate with the data channel to transmit the first data signal directly from the first interface circuit to the second interface circuit.

This invention allows data to be transmitted directly between the interface circuits, and in this way eliminates the need for a sophisticated controller or central station. In fact, the central station can be replaced with relatively simple and inexpensive oscillator that does not require complex programming to move data signals from one interface circuit to the other. As explained below, the interface circuits can be adapted such that the first circuit exclusively sends data signals while the second exclusively receives data signals, or alternatively the first and second interface circuits can each send data signals to the other.

The invention itself, together with further objects and attendant advantages, will best be understood by reference to the following detailed description, taken in conjunction with the accompanying drawings.

BRIEF DESCRIPTION OF THE DRAWINGS

FIGS. 6a through 6i are a series of wave form and signal diagrams that illustrate the operation of the embodiment of FIG. 1.

DETAILED DESCRIPTION OF THE PRESENTLY PREFERRED EMBODIMENTS

Figure 1:
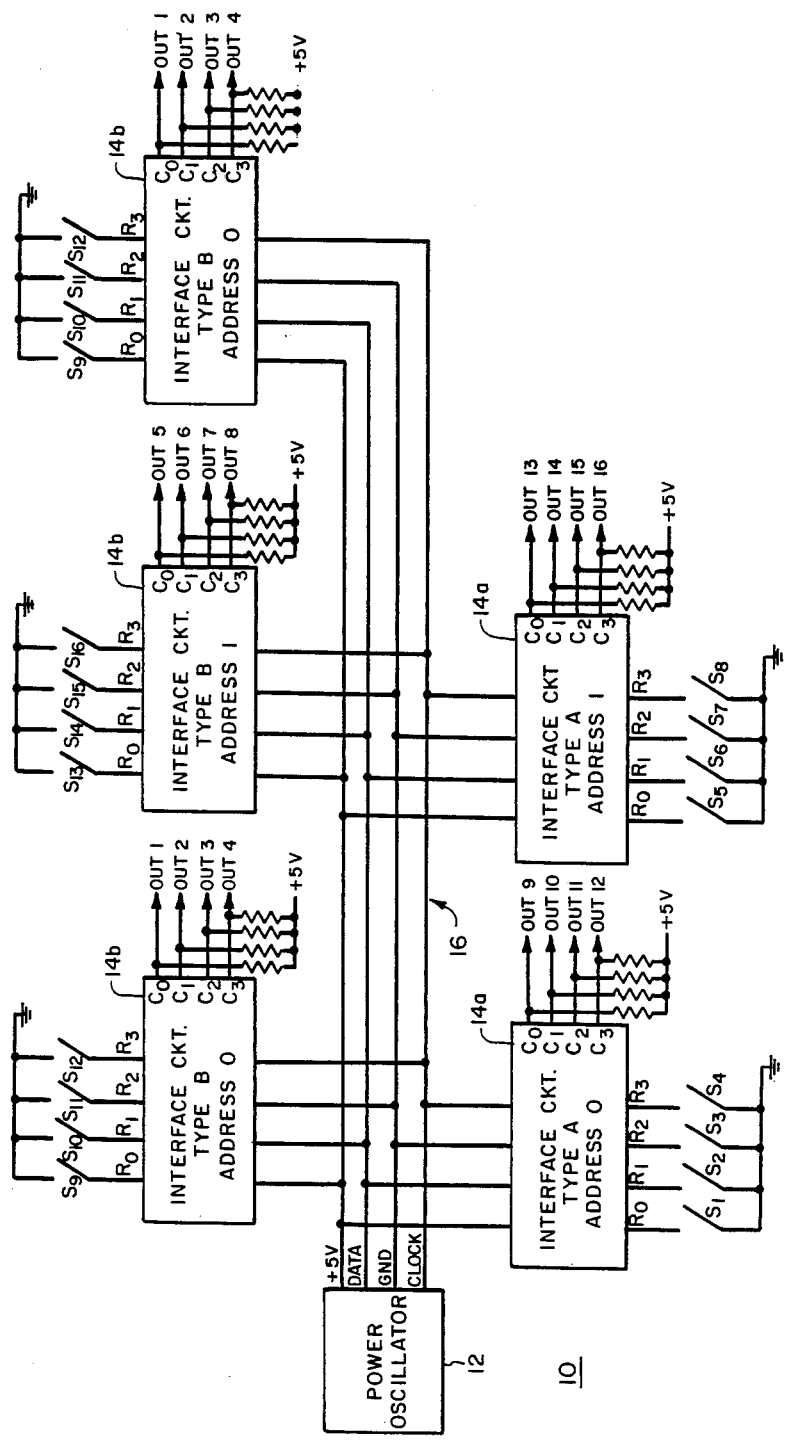
FIG. 1 is a block diagram of a data transmission system which incorporates a presently preferred embodiment of this invention.

Turning now to the drawings, FIG. 1 shows a schematic diagram of a data transmission system 10 which incorporates a presently preferred embodiment of this invention. This transmission system 10 includes a power oscillator 12 and a plurality of interface circuits 14a, 14b. These interface circuits 14a, 14b are of two separate types: type A indicated by the reference number 14a and type B indicated by the reference number 14b. The difference between these two types of interface circuits 14a, 14b will be described in detail below. In general, the number of interface circuits 14a, 14b depends entirely upon the intended application for the data transmission system 10 and can range from as few as two to hundreds of separate interface circuits 14a, 14b.

The interface circuits 14a, 14b and the power oscillator 12 are interconnected by a bus 16 as shown in FIG. 1. This bus 16 includes in the embodiment of FIG. 1 four separate conductors: a pair of power conductors labeled +5V and GND in FIG. 1 which supply electrical power from the power oscillator 12 to the interface circuits 14a, 14b a data conductor which transmits data signals from one interface circuit 14a, 14b to another, and a clock conductor which transmits clock signals generated by the power oscillator 12 to each of the interface circuits 14a, 14b for timing and synchronization purposes.

As shown in FIG. 1 each of the interface circuits 14a, 14b includes four input terminals labeled $R_0$–$R_3$. Each of these input terminals is adapted to receive a binary input signal which can be in either the logic high or the logic low state. In addition, each of the interface circuits 14a, 14b includes four separate output terminals, labeled $C_0$–$C_3$ in FIG. 1. Each of these output terminals $C_0$–$C_3$ is adapted to carry a binary output signal which the interface circuit 14a, 14b can place either in the logic high or the logic low state.

Figure 2:
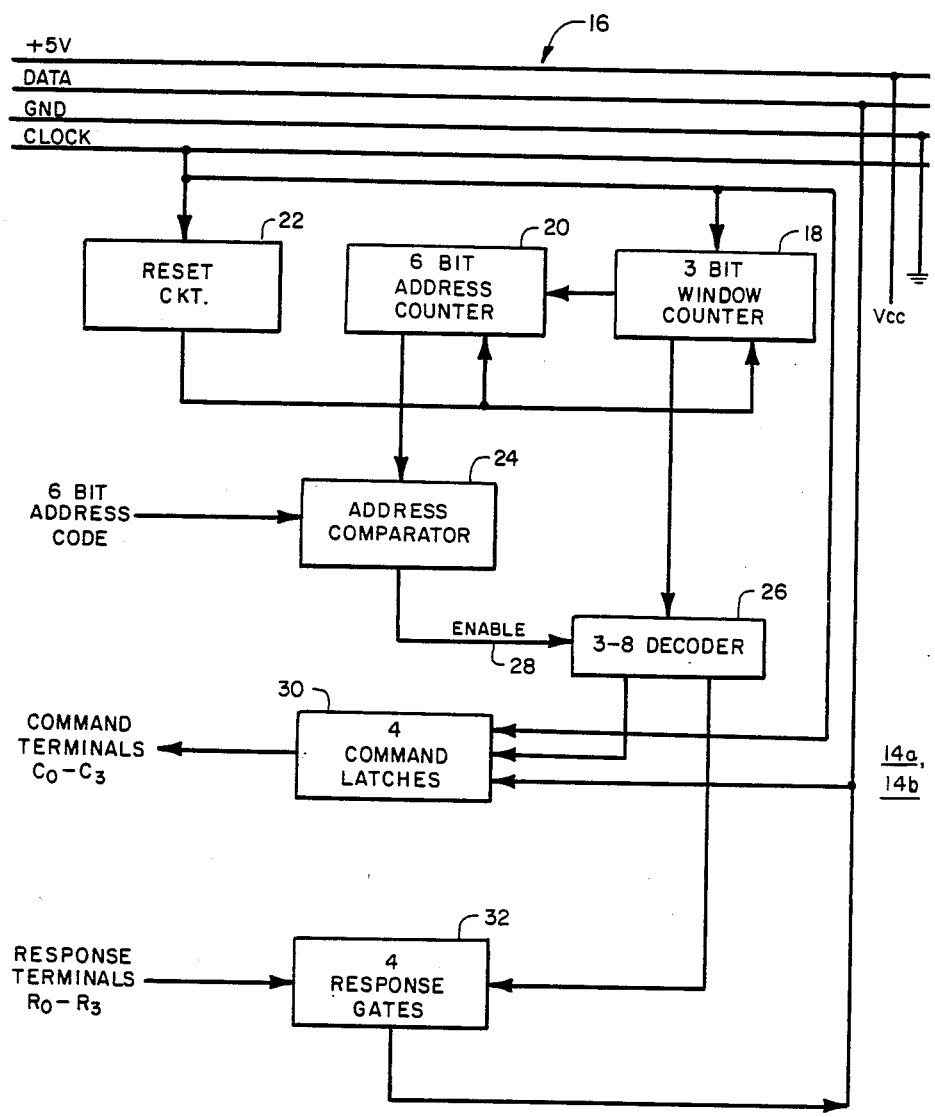
FIG. 2 is a block diagram of one of the interface circuits of FIG. 1.

The block diagram of FIG. 2 provides further information regarding the structure of the interface circuits 14a, 14b. As shown in FIG. 2 each of the interface circuits 14 includes a three bit window counter 18 and a six bit address counter 20. The three bit window counter 18 counts clock signals applied to the clock conductor by the power oscillator 12, and the six bit address counter 20 counts completed cycles of the three bit window counter 18. In effect the two counters 18, 20 form a single integrated nine bit counter which is responsive to the clock signals on the clock conductor. A reset circuit 22 is provided which is also responsive to the clock signals on the clock conductor. In the event a time period greater than a selected duration occurs between adjacent clock signals, the reset circuit 22 generates a reset pulse which resets both of the counters 18, 20. Thus, the power oscillator 12 can synchronize all of the interface circuits 14a, 14b by interrupting the clock pulses on the clock conductor for a time period greater than this predetermined duration.

Each of the interface circuits 14a, 14b includes six terminals for receiving a six bit binary address code. External switches (not shown) are used to set this six bit address code to any one of 64 possible values between 000000 and 111111. A six bit address comparator 24 receives as inputs the six bit address code and the contents of the six bit address counter 20. When the contents of the six bit address counter 20 equals the six bit address code, the address comparator 24 generates an enable signal on line 28.

This enable signal is applied as an enabling control signal to a 3-to-8 decoder 26. This decoder 26 receives as an input the three bit binary number stored by the window counter 18. The 3-to-8 decoder 26 decodes the contents of the window counter 18 to generate a series of control signals. The 3-to-8 decoder 26 generates control signals only when it is enabled by the enable signal on line 28.

The control signals generated by the 3-to-8 decoder 26 are applied to respective ones of four command latches 30 and four response gates 32. Thus, during the subset of 8 clock signals counted in the window counter 18 during the time interval while the address counter 20 is equal to the six bit address code, the 3-to-8 decoder 26 will enable the four command latches 30 and the four response gates 32 in a predetermined sequence. When each of the command latches 30 is enabled, it causes the logic state of the data conductor to be latched and applied to the respective command terminal $C_0$–$C_3$. Similarly, when each of the response gates 32 is enabled by the 3-to-8 decoder 26, the binary signal on the respective one of the response terminals $R_0$–$R_3$ is applied to the data conductor. As explained in greater detail below, the type A and type B interface circuits 14a, 14b differ in the relative order in which the command latches 30 and the response gates 32 are enabled.

Figure 3:
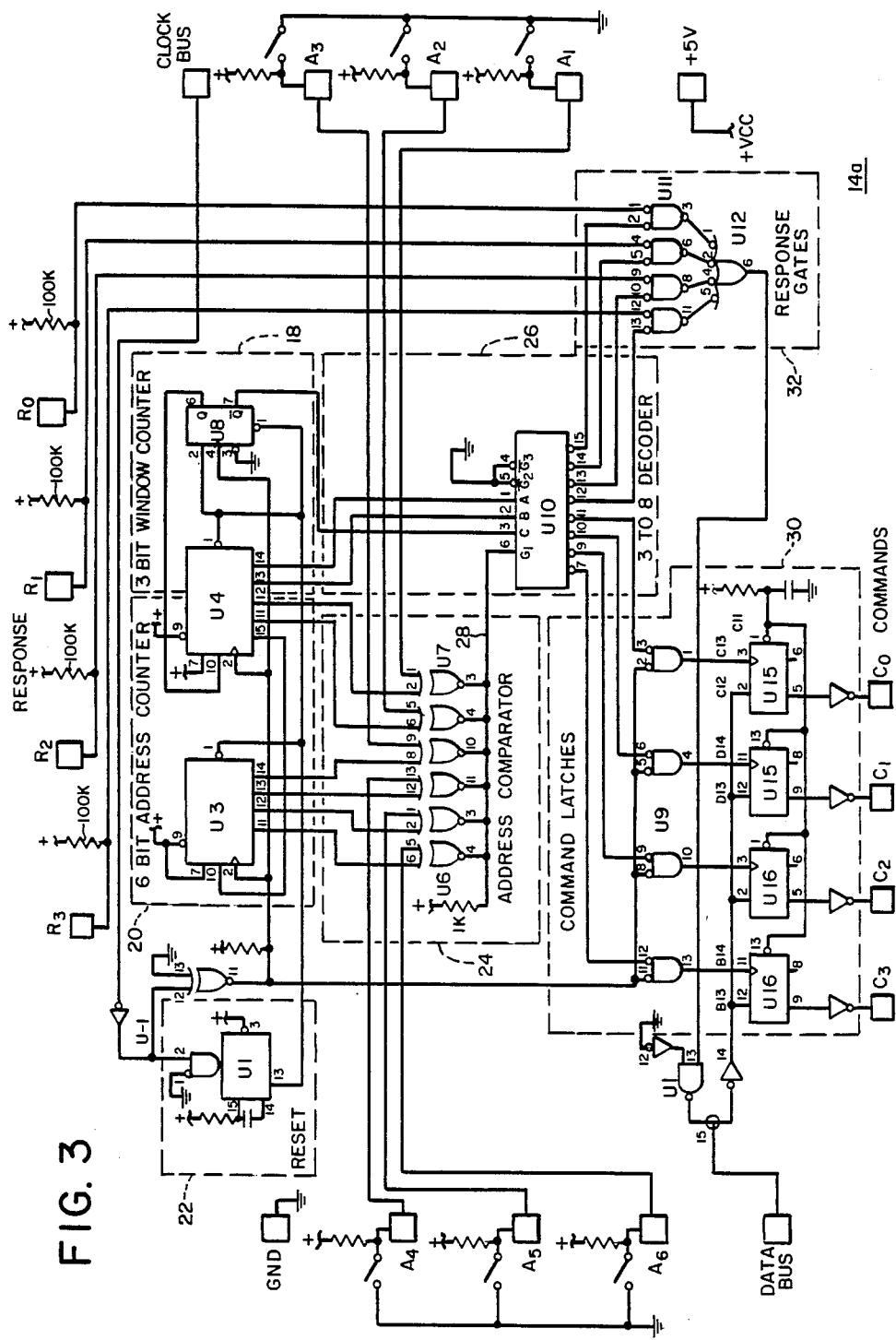
FIG. 3 is a detailed schematic diagram of one of the type A interface circuits.

FIG. 3 shows a detailed schematic diagram of one of the type A interface circuits 14a. As shown in FIG. 3, the address counter 20 and the window counter 18 are implemented as a single integrated counter made up of a pair of four bit counters U3, U4 and a flip flop U8. The counter U4 is arranged to count cycles of the flip flop U8, and the counter U3 is arranged to count cycles of the counter U4. Thus, the two counters U3, U4 and the flip flop U8 form a nine bit counter. The lower order three bits of this counter (corresponding to the output of the flip flop U8 and the low order two bits of the counter U4) constitute the three bit window counter 18 and are applied to the signal inputs of the 3-to-8 decoder 26, which is implemented as an integrated circuit U10 in FIG. 3. The six bit address counter 20 is made up of the counter U3 and the high order two bits of the counter U4. Each of these six counting stages is applied to a respective inverting exclusive OR gate included in the address comparator 24. The other input of each of these inverting exclusive OR gates is coupled to a respective terminal $A_1$–$A_6$ adapted to receive a respective bit of the six bit address code.

As shown in FIG. 3, in this embodiment the reset circuit 22 includes a mono-stable multivibrator U1 which is reset by clock signals appearing on the clock conductor. The resistor and capacitor connected to the multivibrator U1 provide a pulse duration of 50-300 microseconds, preferably about 100 microseconds. In the event consecutive clock signals on the clock conductor are separated by less than this pulse duration, the reset circuit 22 allows the counters 18, 20 to count as described above. However, in the event no clock signals appear on the clock conductor for a period greater than this pulse duration, then the reset circuit 22 generates a reset pulse which resets both the counters U3, U4 and the flip flop U8.

The 3-to-8 decoder 26 applies output signals to the inverting NAND gates U11 included in the response gates 32, and to the inverting AND gates U9 included in the command latches 30. In the event the six bit count stored in the counters U3, U4 is equal to the six bit address code applied to the terminals $A_1$–$A_6$, the address comparator 24 applies an enable signal on line 28 to the 3-to-8 decoder 26. In the absence of such an enable signal all of the output signals of the 3-to-8 decoder 26 are in the logic high state. However, when the 3-to-8 decoder 26 is enabled by the address comparator 24, one of the eight output signals of the 3-to-8 decoder 26 is placed in the logic low state, depending upon the count stored in the three bit window counter 18. Thus, as the three bit window counter 18 cycles from 000 to 111, each of the eight outputs of the 3-to-8 decoder 26 is placed in the logic low state for a respective time period.

The response gates U11, U12 gate a selected one of the binary response signals applied to the terminals $R_0$–$R_3$ to the data conductor. The outputs of the 3-to-8 decoder 26 which are applied to the command latches 30 are gated by the inverting AND gates U9 with the clock signal from the clock conductor, and the resulting gated signal is applied as a clock input to the flip flops U15, U16. These flip flops U15, U16 store the logic state of the data conductor at respective time periods, as determined by the 3-to-8 decoder 26. The binary signals stored in the flip flops U15, U16 are applied via appropriate buffers to the command terminals $C_0$–$C_3$.

Each complete set of clock pulses generated by the power oscillator 12 can be thought of as a sequence of clock pulse bursts, or subsets, each of which includes eight clock pulses in this embodiment. The three bit window counter 18 stores a count indicative of one of eight "windows" in each burst or subset of clock pulses. The address counter 20 counts the number of subsets of clock pulses. The address counter 20 cooperates with the six bit address code and the address comparator 24 to enable the 3-to-8 decoder for only a single subset of clock pulses, determined by the six bit address code. The three bit window counter 18 cooperates with the 3-to-8 decoder 26, the response gates 32 and the command latches 30 to pass the binary signal appearing on each of the response terminals $R_0$–$R_3$ to the data conductor during a respective one of the eight windows, and to latch and store a command from the data conductor for each of the command terminals $C_0$–$C_3$ during a respective one of the eight windows.

Table 1 shows the difference between the type A and type B interface circuits 14a, 14b. In Table 1 the first column lists the window number, which ranges between 0 and 7. The second and third columns identify the data signal assigned to each of the eight windows. As shown in Table 1 in a type A interface circuit 14a the command signals C0–C3 appear on the even windows and the response signals $R_0$–$R_3$ appear on the odd windows. The right hand column of Table 1 shows that type B interface circuits 14b reverse this relationship, assigning the response signals $R_0$–$R_3$ to the even windows and the command signals $C_0$–$C_3$ to the odd windows.

TABLE 1

| WINDOW NUMBER | WINDOW IDENTIFICATION (TYPE A) | WINDOW IDENTIFICATION (TYPE B) |
|---|---|---|
| 0 | $C_0$ | $R_0$ |
| 1 | $R_0$ | $C_0$ |
| 2 | $C_1$ | $R_1$ |
| 3 | $R_1$ | $C_1$ |
| 4 | $C_2$ | $R_2$ |
| 5 | $R_2$ | $C_2$ |
| 6 | $C_3$ | $R_3$ |
| 7 | $R_3$ | $C_3$ |

The type B interface circuits 14b of this embodiment are identical in circuitry of FIG. 3, except that the C input to the 3-to-8 decoder U10 is coupled to the Q (Pin 6) output of the flip flop U8 instead of the $\overline{Q}$ (Pin 7) output of the flip flop U8 as shown in FIG. 3.

As explained in detail below, because the type A interface circuits 14a send responses during the time periods when the type B interface circuits 14b receive commands, and vice versa, it is possible for the interface circuits 14a, 14b to exchange data signals directly from one to the other.

Table 2 identifies presently preferred components of the schematic diagrams of FIG. 3. Each of these components is a well known, readily available commercial device, which needs no further explanation to be intelligible to those skilled in the art.

TABLE 2

| REFERENCE SYMBOL (FIG. 3) | COMPONENT | INTEGRATED CIRCUIT IDENTIFICATION |
|---|---|---|
| U1 | MONOSTABLE MULTI-VIBRATOR | 74LS123 |
| U3 | 4 BIT BINARY COUNTER | 74LS161 |
| U4 | 4 BIT BINARY COUNTER | 74LS161 |
| U6 | INVERTING EXCLUSIVE OR GATE | 74LS266 |
| U7 | INVERTING EXCLUSIVE OR GATE | 74LS266 |
| U8 | J-K FLIP FLOP | 74LS109 |
| U9 | INVERTING AND GATE | 74LS02 |
| U10 | 3-TO-8 DECODER | 74LS138 |
| U11 | INVERTING NAND GATE | 74LS32 |
| U12 | INVERTING OR GATE | 74LS20 |
| U15 | D-TYPE FLIP FLOP | 74LS74 |
| U16 | D-TYPE FLIP FLOP | 74LS74 |

Figure 4:
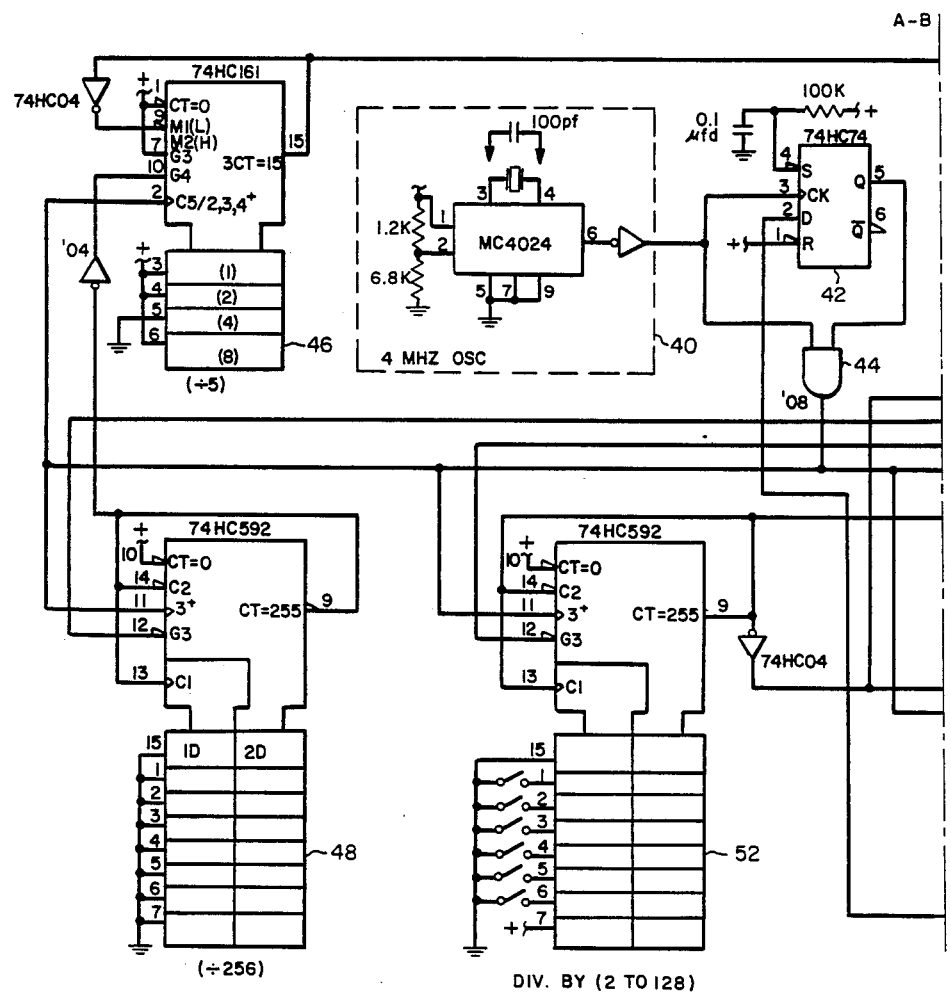
FIG. 4 is a detailed schematic diagram of a first portion of the oscillator of FIG. 1.
Figure 5:
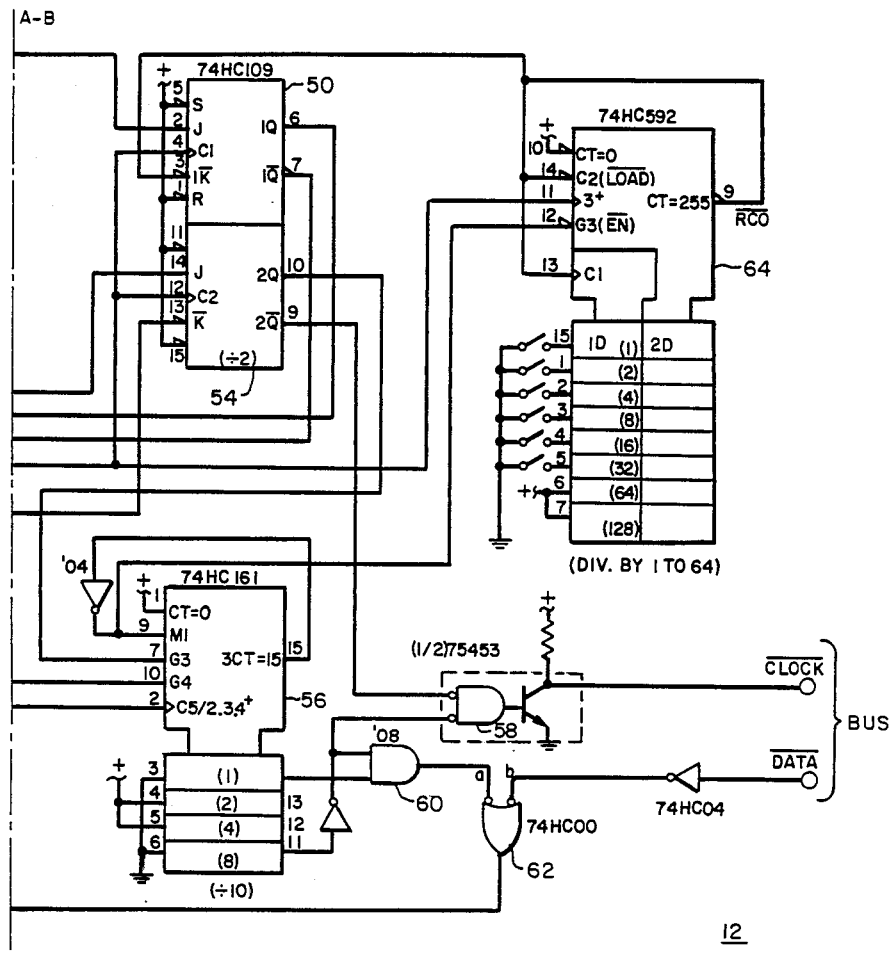
FIG. 5 is a detailed schematic diagram of second portion of the oscillator of FIG. 1.

FIGS. 4 and 5 provide schematic diagrams of the power oscillator 12, and are intended to be arranged side by side to make up a complete circuit diagram. As explained above, this power oscillator 12 generates sets of clock pulses separated by delay periods, wherein each set of clock pulses is made up of a number of bursts or subsets, each consisting of eight clock pulses. As explained below, the circuit of FIGS. 4 and 5 allows both clock period and the number of subsets of clock pulses included in each set to be adjusted by manually operated switches.

Turning now to FIG. 4, the power oscillator 12 includes a voltage controlled astable oscillator 40 which generates a 4 MHz signal at its output. Either a crystal as shown or a capacitor may be used to control the frequency of the oscillator 40. The output of the oscillator 40 is applied as an input to the clock terminal of a data-bus-integrity flip flop 42. The Q input of this flip flop 42 must be in the logic high state in order to enable the 4 MHz oscillator output signal to pass through the AND gate 44.

Two programmable counters 46, 48 are provided which have been configured such that the counter 46 divides by 5, and the counter 48 divides by 256. The two counters 46, 48 are coupled together in cascade and respond to the 4 MHz signal passed by the AND gate 44 in order to divide the 4 MHz oscillator output signal by 1280, giving a frequency of 3.125 KHz or a cycle period of 320 microseconds.

At the completion of this 320 microsecond cycle, the carry output of the counter 46 causes a flip flop 50 to place the 1Q output signal of the flip flop 50 in the logic high state. This disables the counter 48 and enables a counter 52.

Counter 52 is a programmable counter that may be programmed by means of the illustrated switches to divide by any number between 2 and 128. When enabled, the counter 52 counts cycles of the 4 MHz oscillator signal.

The flip flop 54 serves as a divide by 2 counter which responds to the carry output of the counter 52. Thus, the 2Q and $2\overline{Q}$ outputs of the flip flop 54 generate respective square wave signals, having a frequency equal to 1/N1 MHz where N1 is a number between 1 and 64 encoded by the switches coupled to the counter 52. This corresponds to an output frequency of the flip flop 54 which varies between 1 MHz and 15.625 KHz. The flip flop 54 also serves to provide a square wave output.

It is the output signals generated by the flip flop 54 which determine the clock frequency of clock pulses applied to the clock conductor on the bus. Cycles of this clock signal are counted in a programmable counter 56 which is programmed to divide by 10. The counter 56 is a 4 stage binary counter that has been connected to have a pre-set of plus 6, thus shortening the count cycle to 6 through 15 and skipping 0 through 5. During the eight counts 8–15, the fourth stage of the counter 52 is in the logic high state.

The logical state of the clock conductor on the bus is controlled by a driver which includes an AND gate 58. This AND gate 58 receives as one input the $2\overline{Q}$ output of the flip flop 54, and as the other input the inverted signal generated by the fourth stage of the counter 56. Thus, during counts 8–15 of the counter 56, the gate 58 is enabled and it passes the clock signal generated at the $2\overline{Q}$ output of the flip flop 54 onto the clock conductor. During counts 6 and 7 of the counter 56, the clock bus is disabled. For this reason, only eight clock signals are sent out in each burst of clock signals, and a break period of two clock cycles exists between adjacent bursts of the clock signals.

A programmable counter 64 responds to the carry output of the counter 56 to count the number of bursts of clock pulses generated by the counter 56. The counter 64 can be preset by the illustrated switches to any integer N2 between 1 and 64. When the total of N2 and the number of clock pulse bursts equals 64, the counter 64 generates a carry signal which causes the flip flop 50 to change state, thereby enabling the counters 46, 48 and disabling the counter 52 and starting the entire cycle over again. By using the switches connected to the counter 64, a user can select the number of clock signal bursts generated in the cycle to any integer between 1 and 64.

The logical state of the data conductor is tested during the period when the counter 56 has a value of 7. The gate 62 controls the flip flop 42 such that the flip flop 42 enables the gate 44 only when the gate 62 is in the logic high state. When the count stored in the counter 56 is not equal to 7, the input of the gate 62 coupled to the gate 60 is in the logic low state, and the gate 62 is in the logic high state. When the count stored in the counter 56 is equal to 7, the input of the gate 62 coupled to the inverter should be in the logic low state if the data conductor is not shorted, thereby maintaining the gate 62 in the logic high state. However, if the data conductor is shorted to the logic low state while the count of the counter 56 is equal to 7, the gate 62 will cause the flip flop 42 to set the Q output to the logic low state, thereby disabling the gate 44 and interrupting the 4 MHz signal. Operations will resume as soon as the short circuit on the data conductor is removed.

Having described the structure of the transmission system 10, its operation will now be described in conjunction with the timing and signal diagrams of FIG. 6a through 6i.

FIG. 6a shows the clock pulses as they are applied to the clock conductor by the power oscillator 12. These clock pulses are each one microsecond in duration in this example and are formed as a 50 percent duty cycle square wave. The clock pulses are arranged in subsets or bursts of eight, and in this embodiment two consecutive subsets of eight clock pulses makeup the entire set of clock pulses. In this embodiment a delay of 320 microseconds is imposed between adjacent sets of clock pulses. This delay allows the reset circuit 22 time to generate a reset signal in order to insure that the counter 18, 22 of all of the interface circuits 14 start at zero at the beginning of each set of clock pulses.

The interface circuits 14a, 14b having the address code 000000 are enabled for only the first burst of clock pulses, and the interface circuits 14a, 14b having the address 000001 are enabled for only the second burst of clock pulses, as shown in FIG. 6a.

FIGS. 6b shows the arrangement of command and response signals in the windows defined by the type A interface circuits 14a. In FIG. 6b, the signals on the response terminals $R_0$–$R_3$ are applied to the data conductor during the odd windows and the signals on the command terminals $C_0$–$C_3$ are read from the data conductor during the even windows.

As shown in FIG. 6c the type B interface circuits 14b apply the signals on the response terminals $R_0$–$R_3$ to the data conductor during the even windows and retrieve the signals for the command terminals $C_0$–$C_3$ from the data conductor during the odd windows.

FIG. 1 shows an exemplary arrangement of switches S1–S16 and output signals OUT1-OUT16. Each of the response terminals $R_0$–$R_3$ of each of the interface circuits 14a, 14b is in the logic high state unless the corresponding one of the switches $S_1$–$S_{16}$ is closed. Similarly, each of the output signals OUT1-OUT16 is in the logic high state unless the respective command terminal $C_0$–$C_3$ is in the logic low state.

FIGS. 6b and 6c show the assignment of the switches $S_1$–$S_{16}$ and the assignment of the output signals OUT1-OUT16 to the respective windows. It should be noted that each of the switches S1–S16 is assigned to the same window as the respective one of the output signals OUT1-OUT16. Thus, during the second window of the first burst (address 0) switch S1 determines the logic state of the data conductor and the output signal OUT1 responds to the logic state of the data conductor.

This mode of operation will better be understood in conjunction with FIGS. 6d–6i. FIG. 6d shows the switch S2 as being closed at an arbitrary time before the beginning of the frame shown in FIG. 6a. It is assumed at this point that all of the other switches S1 and S3–S16 are open. In this state the data conductor remains in the logic high state until the fourth window of the first burst (address 0), as shown in FIG. 6e. During this window the closed switch S2 causes the respective type A interface circuit 14A to bring the data conductor to the logic low state. As shown in FIG. 6e the data conductor remains in the logic high state except during the fourth window of the first burst (address 0) of each frame.

As shown in FIG. 6f, the output signal OUT2 remains in the logic high state until the fourth window of the first burst, during which all type B interface circuits 14B having the address 0 place the command terminal $C_1$ in the logic low state.

FIG. 6g shows the state of the switch S12, which is closed after the switch S2 but before the second frame which is partially shown in FIG. 6a. As shown in FIG. 6h, the data conductor remains in the logic high state except for the fourth window of the first burst (address 0), when the switch S2 causes the data conductor to be placed in the logic low state, and during the seventh window of the first burst (address 0) when the switch S12 causes the data conductor to be placed in the logic low state. As shown in FIG. 6i the output signal OUT12 is placed in the logic low state by the type A interface circuit 14a having the address code zero, which places the command terminal $C_3$ in the logic low state.

From the foregoing description it should be apparent that the data transmission system 10 allows the type A interface circuits 14a to send data signals directly to the type B interface circuits 14b, and the type B interface circuits 14b to send data signals directly to the type A interface circuits 14a, all without intermediate storage or processing of the data signals by the power oscillator 12. All of the interface circuits 14a, 14b having the same address are enabled during the same burst or subset of clock signals and for this reason a single interface circuit 14a, 14b can send data signals to a number of other interface circuits 14b, 14a. Similarly, signals originating from anyone of a number of interface circuits 14a, 14b can be transmitted to a single interface circuit 14b, 14a.

A simple example of this mode of operation is illustrated in the transmission system 10 of FIG. 1, where the switch S1 can be used to send signals to both of the type B interface circuits 14b having address zero. Similarly, either of the two switches labeled S9 in FIG. 1 can be used to send a data signal to OUT9 of the type A interface circuit 14a.

This feature of the invention can be of importance in many applications. For example, where a single switch input is intended to control a number of separate lights (such as the headlights, the tall lights and the parking lights of a vehicle), one type A interface circuit having the response terminal $R_0$ connected to the switch $S_1$ can be combined with six type B interface circuits, each having a command terminal $C_0$ connected to control a respective one of the six lights. As another example, where it is desired to allow electrical switches in either the front seat or the back seat of a vehicle to control window motors, two type A interface circuits, each having the same address and each having a respective window control switch connected to the response terminal $R_0$, can share their address with a single type B interface circuit having a command terminal $C_0$ which controls the window motor.

Of course, it should be understood that a wide range of changes and modifications can be made to be preferred embodiment described above. For example, it is not critical that each subset of clock pulses define eight windows which alternate commands and responses. Rather, the number of windows in each subset of clock pulses can be varied as required, and the grouping of commands and responses may be modified to suit the intended application. For example, the type A interface circuits may be provided with only command inputs and the type B interface circuits with only response inputs, or vice versa. Alternately, the commands and responses within an eight window system may be arranged as four commands followed by four responses. If desired to improve reliability over long signal propagation distances, clock cycles can be inserted between the command windows and the response windows. Of course, it is not necessary in all applications that both the power and ground conductors be included in the bus, and it is entirely feasible to provide alternate power sources such as batteries for the interface circuits. As yet another alternative, the present invention is well suited for use in fiber optic systems. In such systems, it may well be preferable to multiplex the clock and data signals onto the same fiber optic cable or other data channel.

Related U.S. patent application Ser. No. 0/567,476 describes a preferred packaging arrangement for the interface circuits. As described in this application, the conductors of the bus 16 can be arranged as side-by-side conductors. Alternately, they can be arranged as a pair of coaxial conductors in which the data and clock conductors are shielded by coaxial braids which carry the ground and five volt power signals. Preferably, in this arrangement the coaxial braids are interconnected at regular intervals by capacitances to insure that the braid carrying the five volt signal performs a proper shielding function.

Though the preferred embodiment of the interface circuits 14a, 14b has been described above as including both a lower order window counter 18 and a higher order address counter 20, it should be apparent that in fact these two counters 18, 20 cooperate to maintain a consecutive count of the clock pulses. When looked at in this way, it is clear that the interface circuits 14a, 14b each enable each of the response gates 32 and command latches 30 at a respective clock period of the set of clock periods. It should therefore be clear that it is not necessary in all applications to include separate counters to perform these functions.

It is therefore intended that the foregoing detailed description be regarded as illustrative rather than limiting, and that it be understood that it is the following claims, including all equivalents, which are intended to define the scope of this invention.

We claim:

1. A data transmission system comprising:
   an oscillator comprising means for generating a plurality of sets of clock signals, wherein each of said clock signals defines a respective time period;
   first and second interface circuits; and
   a bus for transmitting a plurality of data signals from the first interface circuit to the second interface circuit and the clock signals from the generating means to the interface circuits;
   said first interface circuit comprising first means for maintaining a first count of the clock signals in each set, first means for storing an address signal, first means for comparing at least a higher order portion of the first count with the address signal and for generating a first enable signal in the event of a match; and means for providing a first data signal to the bus during a first time period which starts a first predetermined number of clock signals after the first enable signal is generated;
   said second interface circuit comprising second means for maintaining a second count of the clock signals in each set, second means for storing the address signal, second means for comparing at least a higher order portion of the second count with the address signal and for generating a second enable signal in the event of a match; and means for reading the first data signal from the bus during said first time period;
   means for detecting a voltage on the bus; and
   means, responsive to the detecting means, for inhibiting generation of the clock signals by the oscillator when the detected voltage is in a selected state indicative of a failure of the bus.

2. The invention of claim 1 wherein the first interface circuit comprises means for providing a second data signal to the bus during a second time period which starts a second predetermined number of clock signals after the first enable signal is generated; and wherein the second interface circuit comprises means for reading the second data signal from the bus during said second time period.

3. The invention of claim 1 wherein the second interface circuit comprises means for providing a second data signal to the bus during a second time period which starts a second predetermined number of clock signals after the second enable signal is generated; and wherein the first interface circuit comprises means for reading the second data signal from the bus during said second time period.

4. The invention of claim 1 wherein the oscillator further comprises:
   a plurality of manually controlled switches; and
   means, responsive to the switches, for adjusting the period of the clock signals.

5. The invention of claim 1 wherein the bus comprises a data channel for transmitting the data signals and a clock channel for transmitting the clock signals, and wherein the voltage detection means detects a voltage on the data channel.

6. A data transmission system comprising:
   an oscillator comprising means for generating a plurality of sets of clock signals, each set comprising m subsets of clock signals; each subset having n clock signals, each clock signal defining a respective time period, where m and n are positive integers and n is greater than 1;
   first and second interface circuits;

a bus interconnected between the oscillator and the interface circuits to transmit the clock signals from the oscillator to the interface circuits and to transmit a plurality of data signals between the interface circuits;

each of said interface circuits comprising means for enabling the respective interface circuit for the i$^{th}$ subset of each set of the clock signals where i is a positive integer no greater than m;

means, included in the first interface circuit, for applying a first data signal to the bus during the time period corresponding to the j$^{th}$ clock signal in the subset of clock signals in which the interface circuits are enabled, where j is a positive integer no greater than n;

means, included in the second interface circuit, for reading the first data signal from the bus during the time period corresponding to the j$^{th}$ clock signal in the subset of clock signals in which the interface circuits are enabled, thereby completing direct transmission of the first data signal from the first interface circuit to the second interface circuit via the bus;

means, included in the second interface circuit, for applying a second data signal to the bus during the time period corresponding to the k$^{th}$ clock signal in the subset of clock signals in which the interface circuits are enabled, where k is a positive integer different from j and no greater than n; and means included in the first interface circuit, for reading the second data signal from the bus during the time period corresponding to the k$^{th}$ clock signal in the subset of clock signals in which the interface circuits are enabled, thereby completing direct transmission of the second data signal from the second interface circuit to the first interface circuit via the bus;

wherein the oscillator comprises means for detecting a failure of the bus, and means for inhibiting generation of the clock signals when the detecting means detects a failure of the bus.

7. The invention of claim 6 wherein the oscillator further comprises:
a plurality of manually controlled switches; and
means, responsive to the switches, for modifying the value of m.

8. The invention of claim 6 wherein the oscillator further comprises:
a plurality of manually controlled switches; and
means, responsive to the switches, for modifying the period of the clock signals.

9. The invention of claim 6 wherein the failure detecting means comprises means for monitoring the bus for a short circuit.

10. The invention of claim 6 wherein k=j+1.

11. The invention of claim 6 wherein the bus comprises a data channel for transmitting the data signals and a clock channel for transmitting the clock signals, and wherein the failure detecting means detects a failure of the data channel.

12. A time multiplexed data transmission system comprising:
first and second interface circuits;
first means for generating a plurality of sets of clock signals, each of which defines a respective time period;
means for interconnecting the interface circuits and the clock means such that the interface circuits receive the clock signals, said interconnecting means comprising at least one data channel;
means, included in each of the interface circuits, for maintaining a count of the clock signals in each set and for exchanging data signals with the data channel during time periods associated with selected ones of the counts;
means for detecting a failure of the data channel; and
means, responsive to the detecting means, for preventing said interface circuits from receiving said clock signals during a time period characterized by a failure of the data channel.

13. The invention of claim 12 wherein the data channel comprises a conductor and wherein the detecting means detects a short circuit on the conductor.

14. The invention of claim 12 wherein the preventing means inhibits generation of the clock signals by the first means.

15. The invention of claim 12 wherein the selected ones of the counts are the same for the first and second interface circuits such that the interface circuits exchange data signals directly with one another via the data channel.

16. The invention of claim 12 wherein the interconnecting means comprises a clock channel, separate from the data channel, for transmitting the clock signals.

17. A data transmission system comprising:
an oscillator comprising means for generating a plurality of sets of clock signals, wherein each of said clock signals defines a respective time period;
first and second interface circuits; and
a bus for transmitting a plurality of data signals from the first interface circuit to the second interface circuit and the clock signals from the generating means to the interface circuits;
said first interface circuit comprising first means for maintaining a first count of the clock signals in each set, first means for storing an address signal, first means for comparing at least a higher order portion of the first count with the address signal and for generating a first enable signal in the event of a match; and means for providing a first data signal to the bus during a first time period which starts a first predetermined number of clock signals after the first enable signal is generated;
said second interface circuit comprising second means for maintaining a second count of the clock signals in each set, second means for storing the address signal, second means for comparing at least a higher order portion of the second count with the address signal and for generating a second enable signal in the event of a match; and means for reading the first data signal from the bus during said first time period;
means for detecting a voltage on the bus;
means, responsive to the detecting means, for inhibiting generation of the clock signals by the oscillator when the detected voltage is in a selected state indicative of a failure of the bus; and
means for disabling the voltage detecting means during the first time period such that the detected voltage is unrelated to the first data signal.

18. A data transmission system comprising:
an oscillator comprising means for generating a plurality of sets of clock signals, each set comprising m subsets of clock signals; each subset having n clock signals, each clock signal defining a respective time period, where m and n are positive integers and n is greater than 1;

first and second interface circuits;

a bus interconnected between the oscillator and the interface circuits to transmit the clock signals from the oscillator to the interface circuits and to transmit a plurality of data signals between the interface circuits;

each of said interface circuits comprising means for enabling the respective interface circuit for the $i^{th}$ subset of each set of the clock signals where i is a positive integer no greater than m;

means, included in the first interface circuit, for applying a first data signal to the bus during the time period corresponding to the $j^{th}$ clock signal in the subset of clock signals in which the interface circuits are enabled, where j is a positive integer no greater than n;

means, included in the second interface circuit, for reading the first data signal from the bus during the time period corresponding to the $j^{th}$ clock signal in the subset of clock signals in which the interface circuits are enabled, thereby completing direct transmission of the first data signal from the first interface circuit to the second interface circuit via the bus;

means, included in the second interface circuit, for applying a second data signal to the bus during the time period corresponding to the $k^{th}$ clock signal in the subset of clock signals in which the interface circuits are enabled, where k is a positive integer different from j and no greater than n; and means, included in the first interface circuit, for reading and second data signal from the bus during the time period corresponding to the $k^{th}$ clock signal in the subset of clock signals in which the interface circuits are enabled, thereby completing direct transmission of the second data signal from the second interface circuit to the first interface circuit via the bus;

means for detecting a failure of the bus; and means for inhibiting generation of the clock signals when the detecting means detects a failure of the bus;

wherein the detecting means is inoperative during the time periods corresponding to the subsets of clock signals.

19. A time multiplexed data transmission system comprising:

first and second interface circuits;

first means for generating a plurality of sets of clock signals, each of which defines a respective time period;

means for interconnecting the interface circuits and the clock means such that the interface circuits receive the clock signals, said interconnecting means comprising at least one data channel;

means, included in each of the interface circuits, for maintaining a count of the clock signals in each set and for exchanging data signals with the data channel during time periods associated with selected ones of the counts;

means for detecting a failure of the data channel;

means, responsive to the detecting names, for preventing said interface circuits from receiving said clock signals during a time period characterized by a failure of the data channel; and means for activating the detecting means only during time periods when none of the interface circuits is exchanging data signals with the data channel.

* * * * *